US008853591B2

(12) United States Patent
Wang et al.

(10) Patent No.: US 8,853,591 B2
(45) Date of Patent: Oct. 7, 2014

(54) SURFACE TREATMENT EQUIPMENT INCLUDING A LASER ENGRAVING SYSTEM FOR TREATMENT OF A STRIP

(75) Inventors: Han-wei Wang, New Taipei (TW); Jung-kuang Liu, New Taipei (TW); Tsai-sheng Shen, New Taipei (TW)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 545 days.

(21) Appl. No.: 13/183,397

(22) Filed: Jul. 14, 2011

(65) Prior Publication Data

US 2013/0015165 A1    Jan. 17, 2013

(51) Int. Cl.
*B23K 26/38*    (2014.01)
*B23K 26/03*    (2006.01)
*B23K 26/36*    (2014.01)
*B23K 1/20*    (2006.01)

(52) U.S. Cl.
CPC ............... *B23K 1/20* (2013.01); *B23K 26/032* (2013.01); *B23K 26/36* (2013.01)
USPC ............ 219/121.68; 219/121.82; 219/121.83; 226/33

(58) Field of Classification Search
CPC ............ B23K 26/032; B23K 26/0838; B23K 26/0846; B23K 26/365; B23K 26/385; B23K 26/4005; B23K 26/401
USPC ............. 219/121.68, 121.69, 121.82, 121.83, 219/121.67, 121.61; 226/33, 34
See application file for complete search history.

(56) References Cited

U.S. PATENT DOCUMENTS

| 3,786,976 | A | * | 1/1974 | Murphy, II | 226/33 |
| 3,939,542 | A | * | 2/1976 | Reggi | 29/718 |
| 4,607,582 | A | * | 8/1986 | Brocklehurst | 226/34 |
| 2003/0057194 | A1 | * | 3/2003 | Fidalgo | 219/121.72 |
| 2006/0060045 | A1 | * | 3/2006 | Koenders | 83/13 |
| 2009/0199950 | A1 | * | 8/2009 | Kitada et al. | 156/64 |

FOREIGN PATENT DOCUMENTS

JP    2007-014993 A * 1/2007

OTHER PUBLICATIONS

Machine translation of Japan Patent document No. 2007-014,993, Dec. 2013.*

* cited by examiner

*Primary Examiner* — Geoffrey S Evans
(74) *Attorney, Agent, or Firm* — Cheng-Ju Chiang

(57) ABSTRACT

A surface treatment equipment is designed for forming nickel barriers on a plurality of terminals for preventing solder wicking is disclosed. The surface treatment equipment includes a retractable feeding system, a laser engraving system, an image sensor, and a control system. The retractable feeding system is utilized to transmit a strip that has the terminals. The laser engraving system is utilized to ablate the terminals. The image sensor is utilized to collect a plurality of images of the ablated terminals. The control system receives the images to perform image recognition. When a defective terminal is recognized, the control system controls the retractable feeding system to transmit in reverse and controls the laser engraving system to repeatedly ablate the defective terminal. The defective terminals can be automatically recognized by the image sensor accompanying the control system. Thus, the drawback of a human visual inspection is solved.

3 Claims, 3 Drawing Sheets

SURFACE TREATMENT EQUIPMENT INCLUDING A LASER ENGRAVING SYSTEM FOR TREATMENT OF A STRIP

FIELD OF THE INVENTION

The present invention relates to a surface treatment equipment, and especially to a surface treatment equipment for forming nickel barriers on terminals to prevent solder wicking

BACKGROUND OF THE INVENTION

At present, a conventional terminal used in electronic industry is made from bending of metal materials. One end of the terminal thereof is welded to a circuit board by a surface-mount technology (SMT), and the other end of the terminal thereof from bending the metal materials can form an elastic contact arm, thereby contacting other electronic components. However, solder paste which is generally used by the SMT for welding the terminal to the circuit board, can easily migrate along the bent portion of the metal materials resulting a welding defect; this is known as a solder wicking phenomenon.

In order to improve the above-mentioned solder wicking phenomenon, the structure of the terminal is usually transformed so as to block the solder wicking Further, a solder receiving hole is formed between the plastic and the terminal for blocking the solder wicking Moreover, a nickel barrier can be established by using a laser ablation for blocking the solder wicking More specifically, the laser can be used to remove a part of gold plating of the terminal for exposing nickel, and then the solder can migrate up until the exposed nickel area.

Currently, a large number of the terminals are disposed on a strip so as to facilitate the laser ablation. However, there is no the capability of defective product testing during the nickel barrier establishment at present. The defects of gold plating residue on the ablated terminal, or wrong positions of the ablation on the terminal, or terminal missing on the strip requires a worker to visually inspect. This is not only a waste of time; it is also a waste of human labor.

SUMMARY OF THE INVENTION

Accordingly, an objective of the present invention is to provide a surface treatment equipment. The defective products can be automatically recognized by an image sensor, so the defective products can be ablated twice or can be issued a warning.

To achieve the foregoing objective, according to an aspect of the present invention, a surface treatment equipment is provided for forming nickel barriers on a plurality of terminals so as to prevent solder wicking The surface treatment equipment includes a retractable feeding system, a laser engraving system, an image sensor and a control system. The retractable feeding system is utilized to transmit a strip that has the terminals. The laser engraving system is disposed on a transmission path of the strip for ablating the terminals.

The image sensor is disposed beside the laser engraving system for collecting a plurality of images of the ablated terminals. The control system is electrically coupled to the retractable feeding system, the image sensor and the laser engraving system. The control system receives the images to perform image recognition. When the control system recognizes a defective terminal, the control system controls the retractable feeding system to reversely transmit and controls the laser engraving system to repeatedly ablate the defective terminal.

In one preferred embodiment, the retractable feeding system has a motor which is electrically coupled to the control system, and the motor is utilized to drive the transmission as well as the reverse transmission of the strip. The retractable feeding system has a plurality of strip reels for winding the strip. The retractable feeding system has at least one location pin and a pneumatic cylinder. The location pin is utilized to be inserted into one of location holes corresponding to the terminals on the strip, and the pneumatic cylinder is utilized to fix the strip by pressing the strip.

Specifically, after ablating all of the terminals, the control system controls the retractable feeding system to receive the strip and controls the image sensor to collect the images at the same time. When the control system recognizes a defective terminal, the control system controls the retractable feeding system to reversely transmit, so that the defective terminal is aligned with the laser engraving system. Furthermore, the laser engraving system ablates the defective terminal twice. After ablating the defective terminal twice, the retractable feeding system continues to receive the strip, and the image sensor continues to collect the images of the defective terminal, and the control system continues to recognize the images. When the image is recognized as a defective terminal, the surface treatment equipment issues an alarm. On the other hand, when the image is recognized as a normal terminal, the retractable feeding system continues to receive the strip, and the control system continues to recognize the images.

Compared with the prior art, according to the surface treatment equipment of the present invention, the defective terminals can be automatically recognized by the image sensor accompanying the control system. Thus, the drawback of the human visual inspection is solved. In addition, the defective terminal can be ablated twice by means of the retractable feeding system reversely transmitting the strip, thereby achieving the advantage of automated reworking.

It is to be understood that both the foregoing general description and the following detailed description of the present invention are exemplary and explanatory and are intended to provide further explanation of the invention as claimed.

DETAILED DESCRIPTION OF THE PREFERRED EMBODIMENTS

Figure 1:
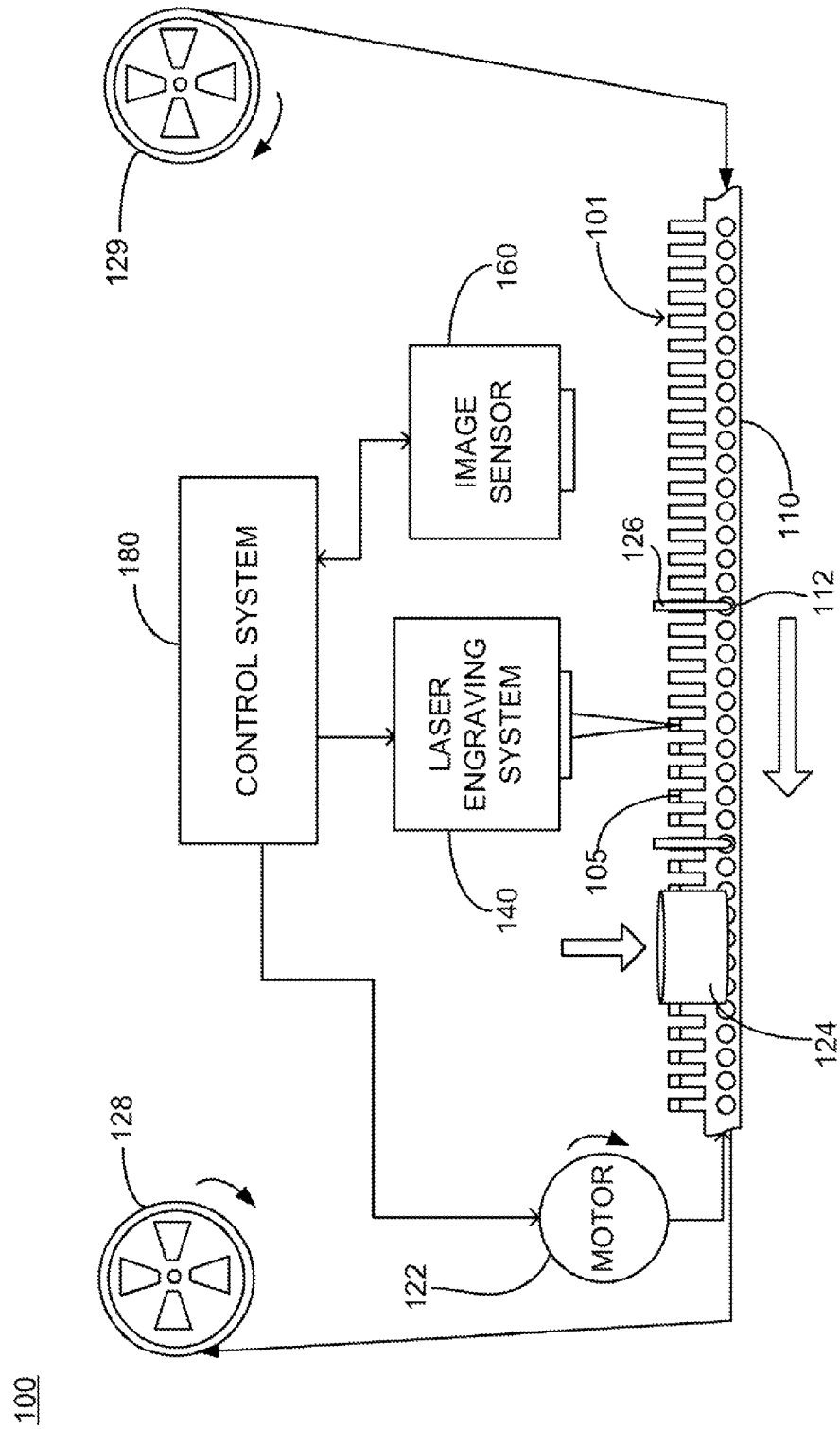
FIG. 1 is a block diagram illustrating a surface treatment equipment according to a preferred embodiment of the present invention.

The present invention will now be described in detail with reference to a preferred embodiment thereof as illustrated in the accompanying drawings. In different drawings the same reference numbers will be used throughout the drawings to refer to the same or like parts. Referring to FIG. 1, FIG. 1 is a block diagram illustrating a surface treatment equipment according to the preferred embodiment of the present invention. The surface treatment equipment is used for forming nickel barriers 105 on a plurality of terminals 101, and this can prevent a solder wicking phenomenon. The surface treatment equipment according to the preferred embodiment the present invention is generally designated at 100.

The surface treatment equipment 100 of the preferred embodiment includes a retractable feeding system (not shown), a laser engraving system 140, an image sensor 160 and a control system 180. The control system 180 is electrically coupled to the retractable feeding system, the image sensor 160 and the laser engraving system 140. The retractable feeding system described herein has a motor 122, a pneumatic cylinder 124, at least one location pin 126, and a plurality of strip reels (i.e. a first strip reel 128 and a second strip reel 129).

The retractable feeding system is utilized to transmit a strip 110 that has the terminals 101. For example, the motor 122 is electrically coupled to the control system 180, such that the motor 122 is utilized to drive the transmission as well as the reverse transmission of the strip 110. More specifically, the first strip reel 128 is utilized to receive the strip 110 transmitted by the motor 122. In the embodiment, the strip 110 is transmitted toward the left, and the first strip reel 128 rotates clockwise to receive the strip 110. On the other hand, the second strip reel 129 rotates clockwise to release the strip 110.

Moreover, the location pin 126 is utilized to be inserted into one of the location holes 112 corresponding to the terminals 101 on the strip 110 for positioning. After positioning, the pneumatic cylinder 124 is utilized to fix the strip 110 by pressing the strip 110.

The laser engraving system 140 is disposed on a transmission path of the strip 110. After the strip 110 being fixed by the pneumatic cylinder 124, the laser engraving system 140 emit laser to ablate the terminals 101, thereby removing the gold plating on the terminals 101 and exposing parts of the nickel, that is, the nickel barriers 105.

Figure 2:
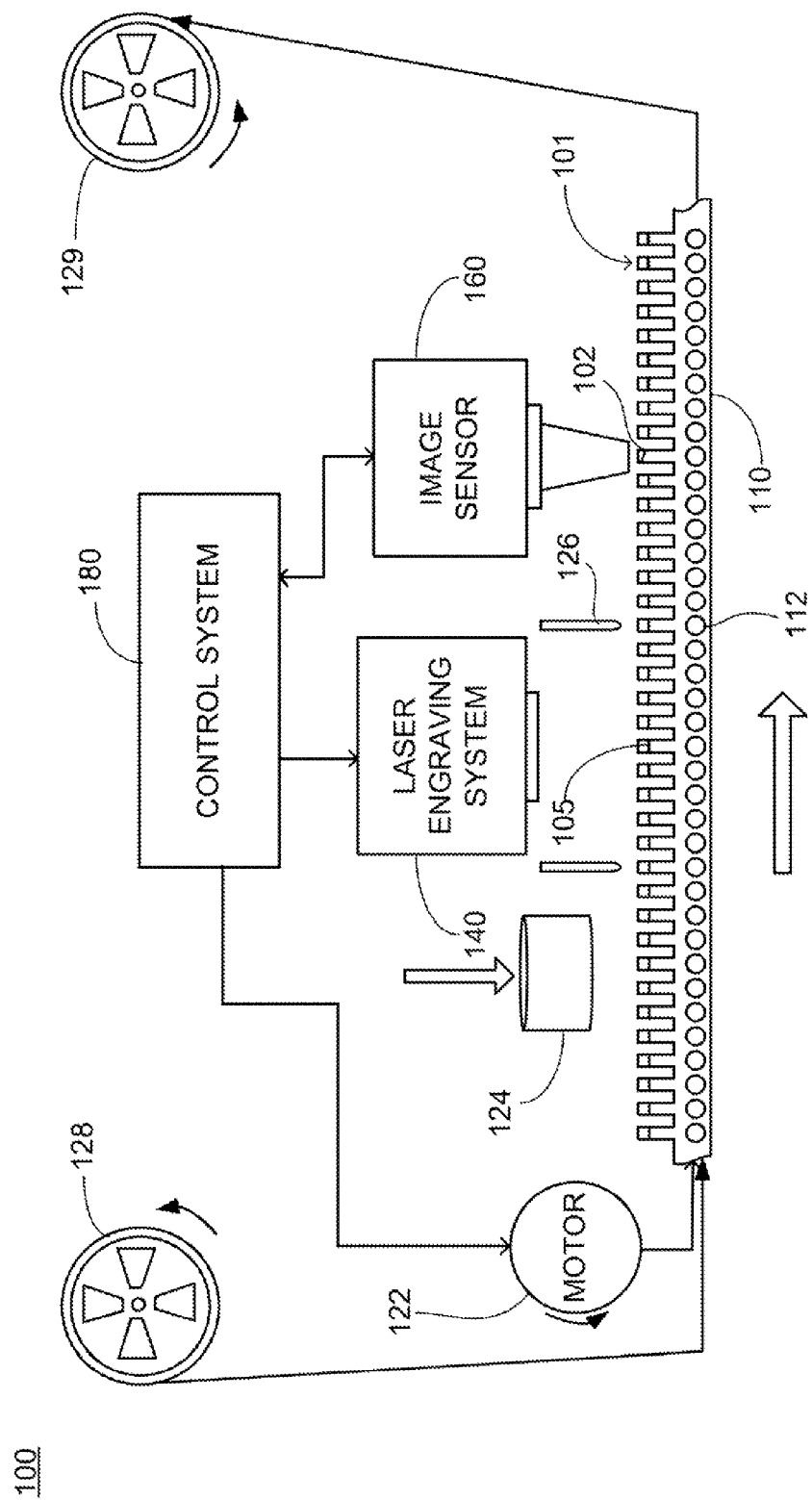
FIG. 2 is a schematic drawing illustrating an image sensor detection.

Referring to FIG. 2, FIG. 2 is a schematic drawing illustrating detection of the image sensor. The image sensor 160 is disposed beside the laser engraving system 140 for collecting a plurality of images of the ablated terminals 101. After all of the terminals on the strip 110 being ablated, the control system 180 controls the retractable feeding system to receive the strip 110 and controls the image sensor 160 to collect the images at the same time. Specifically, when all of the terminals on the strip 110 are ablated, that is, when the strip 110 within the second strip reel 129 is transmitted to the first strip reel 128, the motor 122 rotates counterclockwise for driving the strip 110 which is transmitted toward the right. The first strip reel 128 rotates counterclockwise to release the strip 110. On the other hand, the second strip reel 129 rotates counterclockwise to receive the strip 110.

Figure 3:
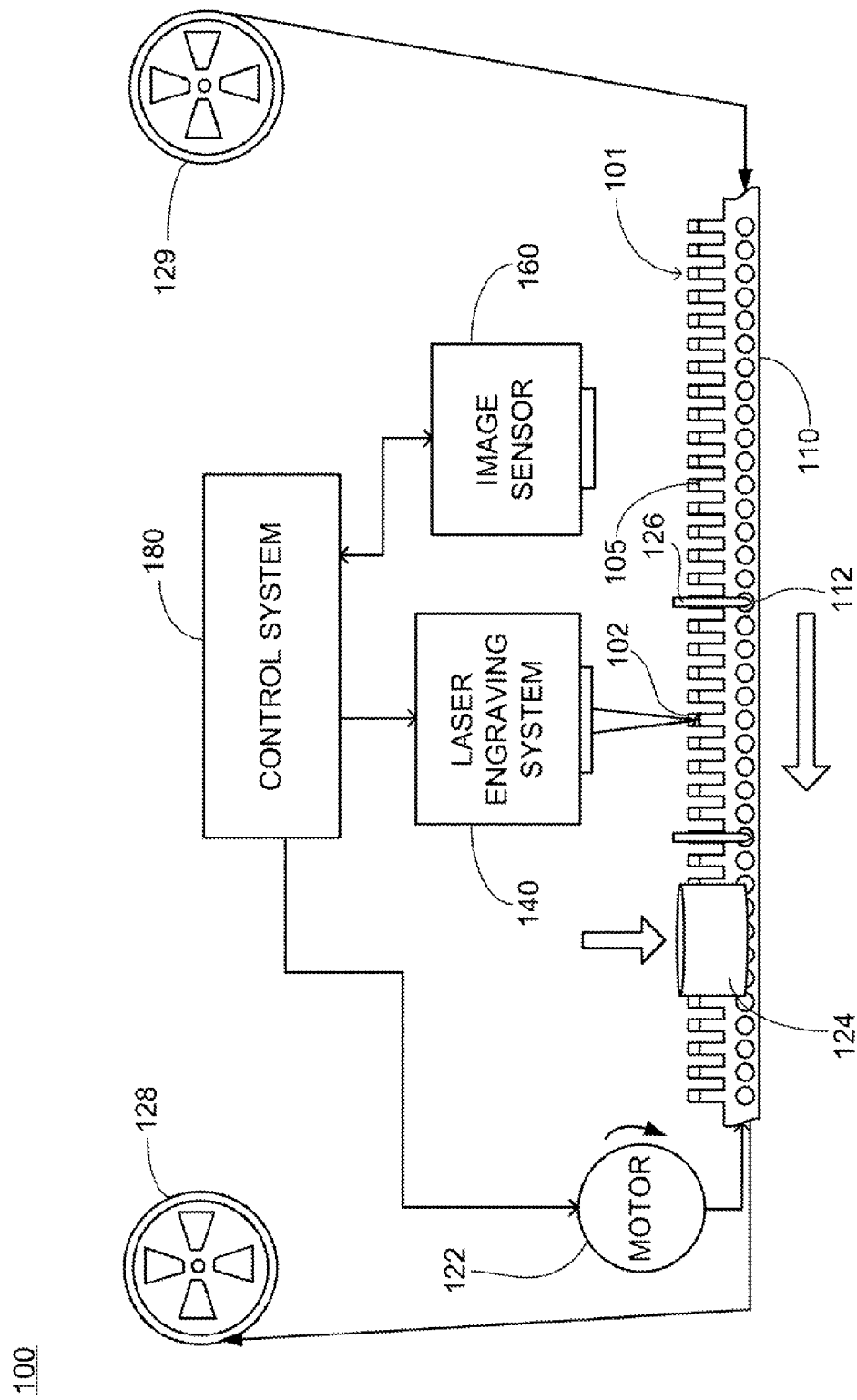
FIG. 3 is a schematic drawing illustrating a secondary ablation according to the preferred embodiment of the present invention.

The control system 180 receives the images to perform image recognition. Once a defective terminal 102 is recognized, the control system 180 controls the retractable feeding system to reversely transmit and controls the laser engraving system 140 to repeatedly ablate the defective terminal 102. Referring to FIG. 3, FIG. 3 is a schematic drawing illustrating the ablation secondary according to the preferred embodiment of the present invention. More specifically, when the control system 180 recognizes the defective terminal 102, the control system 180 controls the retractable feeding system to reversely transmit the strip 110, such that the defective terminal is aligned with the laser engraving system 140. Subsequently, the laser engraving system 140 ablates the defective terminal 102 twice.

After ablating the defective terminal 102 twice, the retractable feeding system continues to receive the strip 110, and the image sensor 160 continues to collect the image of the defective terminal 102, and the control system 180 continues to recognize the image. For example, if the image is still recognized as a defective terminal, that is, the defective terminal 102 can not be repaired, the surface treatment equipment 100 can issue alarms. Similarly, if there is a pin missing (ex. a terminal missing) on the strip 110, the surface treatment equipment 100 can also issue alarms, thereby avoiding generating the defective products caused by proceeding with the following processes. However, the present invention is not limited to rework twice, and the number of times to rework can be set in the control system 180.

On the other hand, when the image is recognized as a normal terminal, the surface treatment equipment continues to receive the strip 110, and the control system 180 continues to recognize the image until the second strip reel 129 receives the strip 110 completely. Accordingly, the nickel barrier of the terminals 101 is done with an assurance that no defective product occurs.

In summary, according to the surface treatment equipment 100 of the embodiment, the defective terminals can be automatically recognized by the image sensor 160 accompanying the control system 180. Thus, the drawback of the human visual inspection is solved. Moreover, the defective terminal 102 can be ablated twice by means of the retractable feeding system transmitting the strip 110 in reverse, thereby achieving the advantage of automated reworking.

While the preferred embodiments of the present invention have been illustrated and described in detail, various modifications and alterations can be made by persons skilled in this art. The embodiment of the present invention is therefore described in an illustrative but not restrictive sense.

What is claimed is:

1. A surface treatment equipment, for forming nickel barriers on a plurality of terminals for preventing solder wicking, the equipment comprising:
    a retractable feeding system, for transmitting a strip having the terminals, having at least one location pin, wherein the location pin is utilized to be inserted into one of location holes corresponding to the terminals on the strip and has a pneumatic cylinder which is utilized to fix the strip by pressing the strip;
    a laser engraving system, disposed on a transmission path of the strip for ablating a part of gold plating of the terminals for exposing nickel to form the nickel barriers;
    an image sensor, disposed beside the laser engraving system for collecting a plurality of images of the ablated terminals; and
    a control system, electrically coupled to the retractable feeding system, the image sensor, and the laser engraving system, wherein the control system performs an image recognition based on the images collected by the image sensor for recognizing a defective terminal, and controls the retractable feeding system to transmit and reversely transmit, and the laser engraving system to repeatedly ablate the defective terminal.

2. The surface treatment equipment of claim 1, wherein the retractable feeding system has a motor which is electrically coupled to the control system, and the motor is utilized to drive the transmission as well as the reverse transmission of the strip.

3. The surface treatment equipment of claim 2, wherein the retractable feeding system has a plurality of strip reels for winding the strip.

* * * * *